United States Patent [19]

Swift et al.

[11] 4,065,380

[45] Dec. 27, 1977

[54] HYDRODENITRIFICATION USING A TUNGSTEN CONTAINING NI-SMM COMPOSITE CATALYST

[75] Inventors: Harold E. Swift, Gibsonia; Roger F. Vogel, Butler, both of Pa.

[73] Assignee: Gulf Research & Development Company, Pittsburgh, Pa.

[21] Appl. No.: 623,377

[22] Filed: Oct. 17, 1975

[51] Int. Cl.$^2$ ............................................. C10G 23/02
[52] U.S. Cl. ................................. 208/89; 208/254 H; 252/458; 252/465
[58] Field of Search ............... 208/143, 145, 216, 255, 208/254, 260, 304, 305, 89; 252/455 R, 455 H, 458, 459, 465

[56] References Cited

U.S. PATENT DOCUMENTS

| | | | |
|---|---|---|---|
| 3,340,179 | 9/1967 | Gutberlet | 208/254 H |
| 3,437,589 | 4/1969 | Goldthwait et al. | 208/254 |
| 3,510,422 | 9/1967 | Cole et al. | 208/143 X |
| 3,558,525 | 1/1971 | Noble | 252/458 |
| 3,781,195 | 12/1973 | Davis et al. | 208/143 |
| 3,844,978 | 10/1974 | Hickson | 252/455 Z |
| 3,844,979 | 10/1974 | Hickson | 252/455 Z |
| 3,852,405 | 12/1974 | Grandquist | 208/120 |
| 3,887,454 | 1/1975 | Hickson | 208/216 |
| 3,892,655 | 1/1975 | Hickson | 208/216 |
| 3,915,841 | 10/1975 | Murphy, Jr. et al. | 208/143 |
| 3,929,622 | 12/1975 | Grandquist | 252/455 Z |

Primary Examiner—O. R. Vertiz
Assistant Examiner—Gary P. Straub

[57] ABSTRACT

An improved process has been discovered for hydrodenitrification of high nitrogen content charge stocks by effecting the nitrogen removal in the presence of a non-zeolitic catalyst consisting essentially of a nickel and/or cobalt substituted synthetic mica-montmorillonite having dispersed therein tungsten in the form of its oxide and/or sulfide.

8 Claims, 1 Drawing Figure

FIGURE – DENITROGENATION CURVE FOR Ni-SMM-HY COMPOSITE CATALYST, USING TUNGSTEN OR NICKEL TUNGSTEN. CURVE IS DRAWN THROUGH CIRCLES.

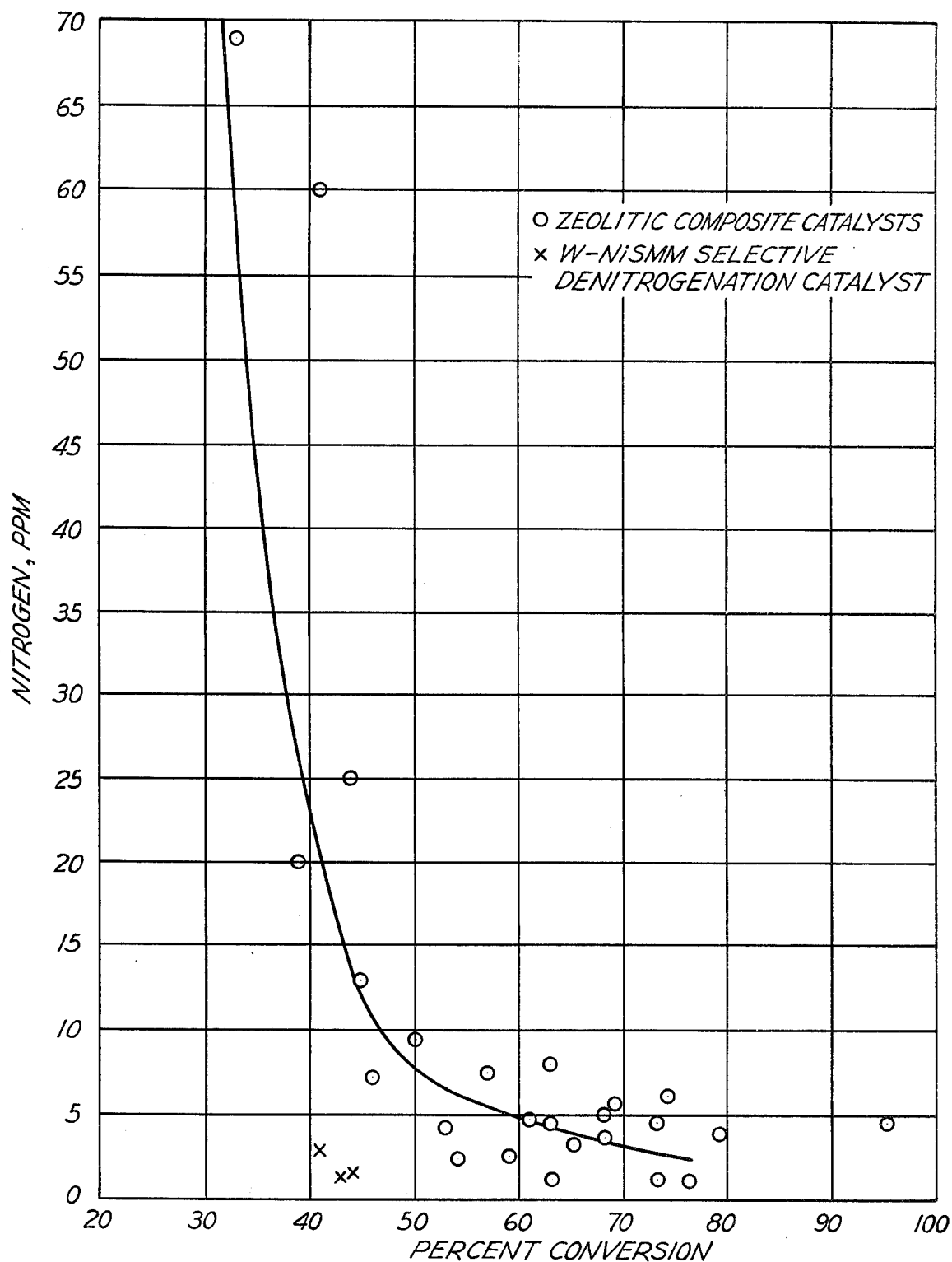
FIGURE – DENITROGENATION CURVE FOR Ni-SMM-HY COMPOSITE CATALYST, USING TUNGSTEN OR NICKEL TUNGSTEN. CURVE IS DRAWN THROUGH CIRCLES.

HYDRODENITRIFICATION USING A TUNGSTEN CONTAINING NI-SMM COMPOSITE CATALYST

INTRODUCTION

This invention relates to a process for the selective removal of nitrogen in the presence of hydrogen from high nitrogen content charge stocks. In particular this invention relates to the use of a particular tungsten containing catalyst in hydrodenitrification reactions.

BACKGROUND OF THE INVENTION

The removal of nitrogen from hydrocarbon containing charge stocks has always been difficult because nitrogen tends to be a catalyst poison. In addition, the removal of nitrogen has usually entailed concomitantly high conversions, and these conversions are frequently not specific to the type of product desired, i.e., middle distillate or gasoline. It is thus desirable to develop a process for selective nitrogen removal at relatively low conversion, and this product may then be subsequently treated by conventional hydrocracking techniques to make more predictably a range of product mix desired.

STATEMENT OF THE INVENTION

In accordance with the invention, a process has now been discovered for the hydrodenitrification of a charge stock containing at least 350 ppm of organic nitrogen, which comprises contacting the charge stock under hydrodenitrification conditions with a non-zeolitic catalyst composite consisting essentially of i. from 60 to 92 weight percent of a laminar 2:1 layer-lattice aluminosilicate mineral possessing layer-lattice unit cells, each cell having an inherent negative charge balanced by cations exterior to said unit cell, said mineral corresponding to the following overall formula prior to drying and calcining:

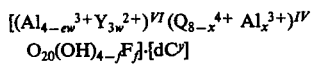

$$[(Al_{4-ew}{}^{3+} Y_{3w}{}^{2+})^{VI}(Q_{8-x}{}^{4+} Al_x{}^{3+})^{IV}$$
$$O_{20}(OH)_{4-f}F_f]\cdot[dC^y]$$

where Al is aluminum;
Y is selected from the class consisting of nickel, cobalt and mixtures thereof;
Q is at least 0.95 mol fraction silicon ions, the remainder consisting of tetravalent ions having an ionic radius not to exceed 0.65 A; and
F is fluorine;
C is at least one charge-balancing cation; and where $e$ has a numerical value from 2 to 3 inclusive;
$w$ has a numerical value from 0.01 to 2 inclusive, with the proviso that the quantity $ew$ have a numerical value from 0.02 to 4 inclusive;
$f$ has a value of 4 or less;
$x$ has a numerical value from 0.05 to 2.0 inclusive;
$y$ is the valence of the cation C;
$d$ is the number of cations C where the product $dy = x + 3(e-2)w$;
and wherein said first bracket represents said layerlattice unit cell formulation and said second bracket represents said charge-balancing cations; and ii. tungsten in the form of metal oxide or metal sulfide or a mixture thereof dispersed through said semicrystalline laminar 2:1 layer lattice aluminosilicate mineral component in an amount from 5 to 30 weight percent of said catalyst composite, calculated as the metal.

Charge Stocks

The charge stocks for use in the process of this invention can be high nitrogen content hydrocarbon type charge stocks which are liquid at processing conditions. Such charge stocks can be suitably derived from many sources such as petroleum, tar sands, oil shale, coal and the like. More specifically, petroleum distillates, solvent deasphalted petroleum residua, shale oils and coal derived liquids or coal tar distillates are suitable. Usually the charge stocks contain substantial amounts of materials boiling above 200° F (93° C.), preferably, substantial amounts of materials boiling in the range of 350° to 1000° F. (177° to 538° C.); and, more preferably, in the range of 700° to 1000° F. (371° to 538° C.).

Suitable charge stocks include those heavy distillates normally defined as full range or heavy gas oils, both straight-run and cracked, as well as conventional FCC feed and portions thereof. The cracked stocks may be obtained from thermal or catalytic cracking of various stocks, including those derived from petroleum, coal, shale and coal tar. The charge stocks normally contain other non-hydrocarbon impurities such as sulfur, and metals in addition to nitrogen, albeit these impurities are mostly chemically combined with carbon and are removed or released by means of a hydrocracking type of reaction.

The catalyst of this invention is useful for the treatment of charge stocks containing at least 350 ppm of organic nitrogen and typically up to 4000 ppm nitrogen, although preferably the organic nitrogen content will be less than 2000 parts per million. Higher nitrogen contents can be tolerated provided the higher nitrogen content charge stocks are diluted to make a final charge material within the range of 350 to 4000 ppm. Several weight percent sulfur can also be tolerated, although the charge stocks usually contain from 0.1 to 2.5 weight percent sulfur. The metals level obviously varies depending on the source of the charge stock, but usually the metals content is from 1 to 5 ppm, mostly in the form of nickel and vanadium, although copper, iron, and other metals may be present.

Hydrodenitrification Conditions

Usually a fixed bed downflow operation is employed, but fluid bed or other types of catalyst-charge stock contacting unit operations can be employed. The hydrodenitrification zone can suitably be operated at a temperature of at least 400° F. (204° C.), preferably at least 500° F. (260° C.) but usually at a temperature below 950° F. (510° C.), preferably below 850° F. (454° C.). The reaction pressure is not critical but usually is in excess of 1000 psig (6.9 MPa), although pressures as low as 800 psig (5.5 MPa) can be employed. Preferably the pressure is above 1000 psig (6.9 MPa) but below 3500 psig (24.1 MPa) for economic reasons. Higher pressures can, of course be used, but it is one of the features of the catalyst of this invention that it operates successfully at relatively low pressures of 800 to 1800 psig (5.5 to 12.4 MPa). The liquid hourly space velocity of the charge stock is suitably in the range of 0.25 to 5.0 volumes of charge stock per volume of catalyst per hour, with the preferred range of space velocity being from 0.5 to 2.5 v/v/hr. Hydrogen is usually supplied at a total rate of 800 to 20,000, preferably 2,000 to 15,000 SCF per barrel (141 to 3560, preferably 352 to 2670 m³H₂/m³ oil). The hydrogen is usually used in the purity range of 80 to 90 weight percent hydrogen, although purities as low as 70 weight percent can be used, and obviously 100% $H_2$ can be employed.

Catalyst Composite

The catalyst composite which can be used in the process of this invention consists essentially of (1) a nickel and/or cobalt substituted synthetic mica-montmorillonite component and (2) a tungsten component. Both of these components will be discussed in the following paragraphs with respect to their definitions, their method of preparation, and the amounts which are utilized to form the catalyst composites of this invention.

1. Laminar Aluminosilicate Mineral

The laminar 2:1 layer lattice aluminosilicate mineral component for use in the catalyst of this invention is a subgroup of the aluminosilicate minerals described by Granquist in U.S. Pat. No. 3,852,405, issued on Dec. 3, 1974. The minerals described by Granquist include a number of metal substituted aluminosilicates wherein the metal used in substituting can be Ni, Co, Cr, Mn, Fe, Cu, Ga, Rh, Sc, Zn, and Mg. The only proxy metals of interest in the present invention are nickel or cobalt or mixtures thereof. Thus, the metal substituted clay-like mineral component used in the catalyst of this invention is a subgroup of those described by Granquist, and is a laminar 2:1 layer-lattice aluminosilicate mineral possessing layerlattice unit cells, each cell having an inherent negative charge balanced by cations exterior to said unit cell, said mineral corresponding to the following overall formula prior to drying and calcining:

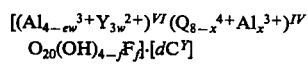

where Al is aluminum;
Y is selected from the class consisting of nickel, cobalt and mixtures thereof;
Q is at least 0.95 mol fraction silicon ions, the remainder consisting of tetravalent ions having an ionic radius not to exceed 0.65 A;
F is fluorine;
C is at least one charge-balancing cation; and where e has a numerical value from 2 to 3 inclusive;
$w$ has a numerical value from 0.01 to 2 inclusive, with the proviso that the quantity $ew$ have a numerical value from 0.02 to 4 inclusive;
$f$ has a value of 4 or less;
$x$ has a numerical value from 0.05 to 2.0 inclusive;
$y$ is the valence of the cation C; and
$d$ is the number of cations C where the product $dy = x + 3(e-2)w$.

In the above formulation, the first bracket represents the overall average laminar layer-lattice unit cell structure formulation, which as will be explained, possesses an inherent negative charge by reason of the fact that the positive charges of the cations are less than the negative charges of the anions. Since the preparation as a whole is electrostatically neutral, the charge-balancing cations which are necessarily present are external to the lattice and are represented by the second bracket, in which C stands for the charge-balancing cations taken as a whole, with $y$ being their average charge and $d$ being the number of charge-balancing cations per unit cell. In this formulation, C may actually correspond to a large variety of charge-balancing cations simultaneously present, such as, for example, a mixture of hydrogen, calcium, and the like cations. For catalytic purposes, it is preferred that the mineral be free of alkali metals which can occur in the exchange sites (C) due to the presence of alkali metals, for example, in the preparative solutions. Minor amounts of alkali metals, such as 5 to 10% of the exchange sites, or as much as 35% of the exchange sites, can be tolerated.

It is clear from the formulation given that Y consists of divalent nickel or cobalt ions either isomorphously substituted for a like number of aluminum ions, whereby a charge deficit results, or substituted on the basis of three divalent ions for two aluminum trivalent ions with no resulting charge deficit, or a mixture of both. In like manner, it is clear that Q, while consisting predominantly of silicon ions, may include a minor proportion of tetravalent ions isomorphously substituted for some of the silicon ions without affecting the overall charge; while trivalent aluminum ions in a proportion represented by subscript $x$ are isomorphously substituted for a like number of silicon ions, whereby a charge deficit results from the substitution of a trivalent ion for a tetravalent ion.

For the sake of convenience, a tabulation follows in which the Y and Q elements usable in accordance with the invention are listed. It will be clear that this listing results from checking each element against its known valence states and its known ionic radius for each applicable valence state, taking into account the coordination number where the latter affects the ionic radius. Tables of ionic radii for various elements have appeared in the literature during the last half century, and in the case of disparity among the values given for a specified element, the best value has been chosen in the light of all of the known data, and this best value is the one which appears in the tables which follow.

TABLE A

| Y: Divalent - Maximum 0.75 A | | |
|---|---|---|
| Nickel | (Ni) | 0.69 |
| Cobalt | (Co) | 0.72 |

TABLE B

| Q: Tetravalent - Maximum 0.65 A | | |
|---|---|---|
| Silicon | (Si) | 0.41 |
| Germanium | (Ge) | 0.53 |

Preferably, in the above unit cell formula, Q is silicon. Further, the value of $e$ is preferably about 2; the value of $w$ from 0.2 to 1.66 with the value of $ew$ being preferably from 0.4 to 3.32. The value of $x$ is preferably from 0.5 to 2, and the value of $f$ is preferably from 0.05 to 3.75.

Moreover, usually, although not necessarily, the composition of the charge-balancing cations in the second bracket contains some proportion of the partial hydroxides of aluminum. Thus, in accordance with a more particular formulation, the composition of the charge-balancing cations in the second bracket contains some proportion of the partial hydroxides of aluminum. Thus, in accordance with a more particular formulation, the composition of the charge-balancing cations in the second bracket may conveniently be represented as follows:

$$[a\ M^n + b\ Al\ (OH)_{3-t}]$$

wherein

and M is at least one charge-balancing cation and is preferably selected from the group consisting of hydrogen; ammonium; substituted ammonium; substituted phosphonium; multivalent metal cations other than aluminum; and partial hydroxides of multivalent metal cations; and $n$ is the unsatisfied valence of M. In practice, the product $bz$ is a small value compared to the product $an$.

This second, more particular characterization of the charge-balancing cations is believed to correspond more closely to the products initially obtained in accordance with the preferred mode of preparation. Moreover, it provides explicitly for any hydroxyaluminum cations which may be present. It will be understood that such hydroxyaluminum cations are commonly present as a mixture of species, as described, for example, in U.S. Geological Survey Water-Supply Paper 1827-A (1967), which is incorporated herein by reference. However, since these chargebalancing cations are essentially exchangeable without disturbing the lattice itself, the latter being represented by the first bracket, after having made a given preparation in accordance with the invention by a preferred procedure, it is relatively simple to exchange a portion of the cations represented by M or indeed substantially all of the cations represented by M in the second bracket for some other preselected cation or mixture of cations. The partial hydroxides of aluminum are exchangeable with difficulty, if at all. Thus, for example, referring to the first general formulation given hereinabove, the charge-balancing cation C can at will be selected from such diverse species as palladium, hydroxyaluminum, hydroxynickel, trimethylammonium, alkyl phosphonium, and the like cations and indeed mixtures thereof. Thus, C may be selected from the group consisting of alkaline earth metal, heavy metal, heavy metal partial hydroxides, ammonium, substituted ammonium, substituted phosphonium, and the like cations and mixtures thereof. As noted above, alkali metals are preferably excluded but may be present in minor amounts.

In the case of the use of substituted ammonium and substituted phosphonium ions and the like, the substituents should be such that they can be driven off during calcination of the mineral.

Those skilled in the art will recognize, accordingly, that the first bracket of the above formula relates to a fixed array of ions in a tripartite lamina which for convenience may be described as muscovite-like, and in which the positive ions shown in the first parentheses are in octahedral coordination with sheets comprising oxygen, hydroxyl, and fluoride ions; whereas the positive ions shown in the second parentheses in the first bracket are in tetrahedral coordination jointly with the aforesaid sheets of oxygen, hydroxyl, and fluoride ions, and also with sheets of oxygen ions in essentially a hexagonal ring array constituting the external faces of the tripartite lamina. The positive ions shown in the second bracket have no essentially fixed position, but are in effect external to the lattice of the tripartite lamina.

Those skilled in the art will also recognize that when some of the parameters in the above formulations have values outside of the stipulated ranges, the formulations reduce to representations of various end members of a broad group of laminar aluminosilicates, which of course are outside of the scope of the present invention. Thus, for example, when $w$ and $x$ both equal zero, and no fluoride ion is present, the first bracket describes the mineral pyrophyllite. It will also be seen that the factor $d$ is equal to zero, when $w$ and $x$ equal zero, so that the ionic species set forth in the second bracket are not present, which of course results from the fact that the lattice of pyrophyllite is charge-balanced. Again, for the case in which $x$ equals zero, $w$ equals two, $e$ equals two, and no fluoride is present, a mineral results in which the lattice is likewise charge-balanced, and the ionic species set forth in the second bracket are not present. Such a mineral is described in U.S. Pat. No. 2,658,875 to Cornelis et al.

In general, 2:1 layer-lattice aluminosilicate minerals, or in alternative nomenclature, tripartite aluminosilicate minerals of the type concerned in the present invention, may be classified as either dioctahedral or trioctahedral, depending upon whether the number of cations per unit cell in the octahedral (or inner) layer is approximately 4 or 6, respectively. The foregoing structural formula is, as stated, an overall formula for a given preparation, and the fact that the number of each octahedral cations may vary from 4 to 6 in a continuous manner in the formulation given does not mean that a single lamina is present having such an intermediate number of cations. In point of fact, the individual laminae are believed to be either dioctahedral or trioctahedral, and in a given preparation the relative proportions of the dioctahedral and trioctahedral species will give rise to the numerical values obtained in quantitatively characterizing the preparation in accordance with the foregoing formula. Where $e$ in the formulation is intermediate between 2 and 3, accordingly, both 1:1 and 3:2 substitutions are present. Because of the extremely small particle size of the minerals, the exact physical nature of these mixed phase systems is uncertain. In any case, in this specification, the term "a mineral" shall mean the 2:1 layer lattice products which are produced by simultaneously synthesizing both the dioctahedral and trioctahedral phases in place in a single reaction mixture. It may be emphasized that such mineral made for use in this invention is a single mineral species, even though it may contain two phases. The minerals of this invention, therefore, differ significantly from compositionally similar mixtures obtained by simply mixing together the separately synthesized dioctahedral and trioctahedral members.

The mineral component can be synthesized by a hydrothermal route as taught by W. T. Granquist in U.S. Pat. No. 3,852,405. As will be evident from the structural formula already given, the reaction mixture for the hydrothermal synthesis includes a source of one or more multivalent cations other than aluminum and silicon. For example, for the case of nickel, this may be a relatively soluble compound, such as, for example, nickel acetate, nickel fluoride, nickel nitrate, and the like; or it may be a relatively insoluble nickel compound such as nickel hydroxide. It is of interest that in general the inclusion of soluble nickel salts in the reaction mixture tends to cause the nickel to occur predominantly in the trioctahedral phase, while relatively insoluble nickel compounds promote its occurrence in the dioctahedral phase. The terms are well understood in the art, and a brief explanation in addition to that already given may be found on page 156 of the book by George Brown, "The X-Ray Identification and Crystal Structures of Clay Minerals," London, 1961. The classical paper by Ross and Hendricks, "Minerals of the Montmorillonite Group," U.S. Geological Survey Professional Paper 205-B (1945), is helpful, particularly for its treatment of variation of the members of a given series of laminar aluminosilicate minerals.

For the other elements useful in practicing the invention, such as cobalt, the most commonly available simple inorganic and organic compounds thereof may in general be used, as will be evident to those skilled in the art.

The mineral component after its preparation is suitably dried and calcined. By "drying" is meant the removal of the external water of absorption by heating. Usually the drying temperatures are from 250° to 350° F. (121° to 177° C.) at atmospheric pressure, albeit higher and lower pressures can, of course, be employed. By "calcining" is meant the addition of heat to effect some chemical change in the catalyst, such as the removal of chemically bound water or ammonia if the charge-balancing cation is $NH_4^+$. The calcining temperatures are normally from about 800° F. to about 1300° F. (427° C. to about 704° C.). Atmospheric pressure is usually employed, but higher or lower pressures can, of course, be used. The maximum calcination temperature should be below that temperature wherein a phase inversion may occur. Thus, dehydration of the dioctahedral phase may preferably occur at normal calcination temperatures, but increased temperatures tend to result in dehydration of the trioctahedral phase which may then recrystallize to form a new undesired mineral species. Minor amounts of ammonium, substituted ammonium, etc., type ions which can be changed during the drying and calcining cycle may remain. Usually C in the formula after drying and calcining is selected from the group consisting of $H^+$, a multivalent metal cation, or the partial hydroxide of a multivalent metal cation.

It is to be understood that the mineral component can be used in the wet prepared state, but this is not preferred. It is preferred that the metal incorporated in the mineral be nickel and its concentration (or that of cobalt) be in the range of 0.1 to 35 weight percent of the mineral component, preferably from 2 to 22 weight percent.

The amount of laminar 2:1 layer-lattice aluminosilicate mineral component may range from 60 to 92 weight percent of the total catalyst composite and usually the amount of the mineral component is from 75 to 90 weight percent.

2. Tungsten Component

The tungsten component is in the form of its oxide or sulfide or any combination thereof. The tungsten component is dispersed as uniformly as possible throughout the catalyst composite by deposition or other methods which are well known in the art. For example, usually and preferably the tungsten is deposited onto the dried or heat activated laminar 2:1 layer-lattice aluminosilicate mineral or mineral from a solution (usually aqueous) of a salt of tungsten which is capable of decomposition to the oxide form via heating and/or calcining in air. The technique of minimum excess solution can suitably be employed or an aqueous solution of a suitable tungsten salt, such as ammonium meta-tungstate, can be added to an aqueous slurry of the formed mineral without intermediate drying or calcining. Since tungsten is too large a metal to proxy for aluminum by substitution in the formation of the aluminosilicate mineral component, the tungsten can even be added during the hydrothermal preparation of the nickel and/or cobalt substituted mineral to save extra steps in the preparation.

The amount of tungsten is at least 5 weight percent, usually 10 to 30 weight percent, and preferably 10 to 20 weight percent of the catalyst composite, calculated as the metal.

A particular advantage of the catalyst of the invention is to remove nitrogen at low conversion levels to obtain a first product which has less than 10 ppm of nitrogen. By "low conversion levels" is meant that less than 50 weight percent of the product boils at a temperature substantially below the boiling range of the charge stock. The product obtained after using the catalyst of this invention may be further distilled or fractionated to remove the portion boiling below 675° F. (357° C.) The portion boiling below 675° F. (357° C.) may be further separated so that the portion of the product boiling below 350° F. (177° C.) contains gasolines and the portion of the product boiling from 350° to 675° F. (177° to 357° C.) contains middle distillates. Products boiling above 675° F. (357° C.) are hydrocracked in the presence of $H_2$ and a hydrocracking catalyst under normal hydrocracking conditions which are well known in the art to produce greater yields of gasoline and middle distillates. Any well known hydrocracking catalyst can be employed. Typical hydrocracking catalysts include supported Group VI and VIII metals, metal oxides and/or metal sulfides, such as nickel, tungsten, and fluorine impregnated on silica alumina or a zeolite-containing catalyst. The liquid hourly space velocity of the charge is suitably in the range of 1 to 2 volumes of charge stock per volume of catalyst per hour. The hydrocracking zone can be suitably operated at a temperature ranging from 600° to 780° F. (316° to 416° C.) and a reaction pressure ranging from 700 to 3000 psig (4.8 to 20.6 MPa). Hydrogen is usually supplied at a total rate of 5,000 to 10,000 SCF per barrel.

The invention will be further described with reference to the following experimental work.

Experimental Work

BRIEF DESCRIPTION OF THE DRAWING

The FIGURE shows the relationship between denitrogenation and conversion.

In all of the examples, the zeolite component of the catalyst composite used for comparison was prepared as follows to convert the zeolite from the commercially available sodium form to the hydrogen Y form (HY zeolite):

1. 400 g of commercially available Linde SK-40 (sodium form zeolite) was slurried (mixed) in 2 liters of water and heated to 80° C. with stirring.

2. 180 g of $NH_4Cl$ was mixed with water to a volume of 300 ml and added to (1). The mixture was slurried 2 hours at 80° C. to exchange the sodium with $NH_4$.

3. The slurry (2) was filtered. The cake was reslurried in 2 liters of water which had been heated to 80° C. and again treated with $NH_4Cl$ as in (2).

4. The slurry (3) was filtered and the cake washed with 4 liters of water.

5. The cake (4) was dried at 250° F. (121° C.) and calcined at 1000° F. (538° C.) to convert the $NH_4$ to the hydrogen form zeolite.

6. The procedures of (1) through (4) were repeated with the calcined cake except that the final cake was washed with 18 liters of water.

7. The filter cake from (6) was dried at 250° F. (121° C.).

8. The catalyst was ground and screened through 50 mesh.

9. The sodium level at this point should be less than 0.25 weight percent.

The laminar aluminosilicate mineral component, if employed as part of the catalyst, was obtained from Baroid Division of NL Industries, Inc., and was prepared in accordance with the teachings in U.S. Pat. No. 3,852,405.

The terminology Ni-SMM is used in the working examples, and this means a nickel substituted synthetic mica-montmorillonite which is the nickel substituted laminar 2:1 layer-lattice aluminosilicate mineral defined above.

The charge stock used in the working examples was an Agha Jari heavy gas oil whose properties are given in Table 1.

TABLE 1

| Inspection | Agha Jari Heavy Gas Oil, LR 18163 |
|---|---|
| Gravity ° API | 23.0 |
| Sulfur: wt % | 1.82 |
| Nitrogen: ppm | 1300 |
| Hydrocarbon Type: Vol.% | |
| Aromatics | 43.9 |
| Saturates | 56.1 |
| Hydrogen: wt % | 12.03 |
| Distillation, | |
| 10% at: ° F. (° C.) | 632 (333) |
| 30 | 756 (402) |
| 50 | 819 (437) |
| 70 | 880 (471) |
| 90 | 945 (507) |
| Pour Point ° F. (° C) | +90 (32) |

Unless indicated otherwise in the examples, the final composite catalyst was pretreated with a gas stream consisting of 92% hydrogen and 8% $H_2S$ at 600° F. (315° C.) at atmospheric pressure with a flow rate of 8.5 × $10^{-3} m^3/hr$ (3 SCF/hr) for two hours.

The following procedure was employed in all of the working examples unless otherwise indicated.

The charge stock was passed downflow through a fixed bed of the catalyst at 1500 psig (10.3 MPa); 1.5 LHSV; and 10,000 SCF of $H_2$/bbl (1780 $m^3 H_2/m^3$ of oil). The temperature was 730° F. (388° C.) during the 8-hour off-stream period and the first 16 hours of on-stream operation. The temperature was then increased to 750° F. (399° C.) for the remainder of the run. The total run was for 104 hours, including the 8-hour off-stream and the 16-hour on-stream operation.

The liquid product was analyzed by gas liquid chromatography (GLC) using ASTM Method D-2877 which is a method to determine boiling range distribution of petroleum fractions. In addition, total nitrogen and sulfur contents were obtained. Reactor off-gas composition was determined by mass spectrometry.

In the examples to follow, "conversion" shall mean the volume percent of the effluent liquid boiling below 675° F. (357° C.). Gasoline is defined as the IBP-350° F. (177° C.) fraction, and middle distillate (furnace oil) as the 350° to 675° F. (177° to 357° C.) fraction.

EXAMPLE 1

Preparation of 80% (15% Ni—SMM) + 20% HY Zeolite

A composite catalyst consisting of 80% by weight of 15% by weight Ni—SMM plus 20% by weight of HY zeolite was prepared by mixing these components and forming them into 14-30 mesh particles. This catalyst had no tungsten.

When the feedstock was passed over this catalyst, a very low activity is obtained, i.e. at 775° F. (412.7° C.), only 22% conversion is obtained. When the temperature is increased to 800° F. (427° C.), 61% conversion is obtained; however, 270 ppm nitrogen still remained in the product. Therefore, Ni-SMM is a poor catalyst without tungsten.

EXAMPLE 2

Preparation of 70% (5% W/Ni-SMM) + 30% HY Zeolite

Nickel substituted synthetic mica-montmorillonite (15 wt % Ni—SMM) material was impregnated with an aqueous solution of ammonium meta-tungstate by the technique of minimum excess solution (incipient wetness). The following preparation is for 5 weight percent tungsten on an Ni—SMM matrix.

1. 54.0 grams of Ni-SMM were weighed in a container;
2. 3.48 grams of ammonium meta-tungstate were dissolved with water to a volume of 78 ml;
3. The solid (1) was brought to the point of incipient wetness by the addition of all of solution (2);
4. The wet solid (3) was oven-dried at 250° F. (121° C.) for 17 hours;
5. The dried solid (4) was crushed and was screened through 100 mesh sieve;
6. 67.83 grams of the screened solid (5) were blended with 29.07 grams of hydrogen Y zeolite (less than 100 mesh size);
7. The mixture (6) was formed into cylinders, about 1¼ inches in diameter by 3 inches in length using a hydraulic press (slugged), then sized to 14-30 mesh.
8. The resulting composite catalyst was calcined at 1000° F. (538° C.) for 10 hours.

EXAMPLE 3

Preparation of Tungsten Impregnated Ni—SMM: 70% (20% W/15% Ni—SMM) + 30% Ni—SMM

Nickel substituted synthetic mica-montmorillonite (15 weight percent Ni—SMM) material was impregnated with an aqueous solution of ammonium meta-tungstate by the technique of minimum excess solution (incipient wetness). The following preparation is for 20 weight percent tungsten on Ni—SMM.

1. 102.15 g of 15 weight percent Ni-SMM was weighed and impregnated with 150 ml of an aqueous solution containing 33.52 g of ammonium meta-tungstate.
2. The wet solid of (1) was dried at 250° F. (121° C.) for 23 hours.
3. The dried solid (2) was screened through a 100 mesh sieve.
4. 127.85 g of the screened solid (3) was blended with 54.79 g of 15 weight percent Ni-SMM in fine powder form.
5. The blended mixture (4) was slugged and sized to 14-30 mesh and calcined at 1000° F. (538° C.) for 10 hours.

Comparison of Denitrogenation Capability

A series of runs were made to compare the selective nitorgen removal ability of the catalyst of this invention (Ex. 3) with a zeolitic catalyst (Ex. 2) at comparable levels of total conversion. The results are summarized in Table 2.

Table 2
SELECTIVE DENITROGENATION COMPARING TUNGSTEN Ni-SMM CATALYST WITH ZEOLITIC CATALYSTS

Feed: Agha Jari HGO LR18163 1300 ppm N
Conditions: 1500 psig (10.3 MPa)
1.5 LHSV;
750° F. (399° C.)

| Ex. No. | Catalyst | Time Period | % Conversion | Nitrogen Product,ppm |
|---|---|---|---|---|
| 4 | 70% (20%W/Ni-SMM) + 30% Ni-SMM (prepared as per Example 3) | 32–40 | 43 | 1.2 |
| | | 56–64 | 44 | 1.7 |
| | | 80–88 | 41 | 3.0 |
| 5 | 70% (5%W/Ni-SMM) + 30% HY (prepared as per Example 2) | 32–40 | 44 | 25 |
| | | 56–64 | 41 | 60 |
| | | 80–88 | 33 | 69 |

Referring to Table 2, Example 4 shows that tungsten impregnated on Ni-SMM results in a catalyst which has an unusual capability to remove nitrogen from high nitrogen containing petroleum and synthetic petroleum feedstocks. The level of denitrogenation which can be accomplished at a given conversion level is much greater than predicted from the performance obtained from zeolitic containing hydrocracking catalysts at the same conversion level (Ex. 5). From Example 4 in Table 2, it is evident that at the 40% conversion level the nitrogen is being reduced to a very low level, i.e. 1.2 to 3.0 ppm by the catalyst of this invention. The zeolite containing catalyst only reduces the nitrogen level to 25 to 69 ppm at the same level of conversion..

A series of composite catalysts was prepared, each containing Ni—SMM as the matrix, H-Y zeolite and using either tungsten or nickel-tungsten as hydrogenation metals. The catalysts were tested for denitrogenation activity at 750° F., 1500 psig (10.3 MPa), and 10,000 SCF H$_2$/bbl using the Agha Jari heavy gas oil of Table 1. A curve was generated (FIGURE) which shows the relationship between denitrogenation and conversion.

The data in the FIGURE show that a zeolite containing catalyst could only be expected to reduce the nitrogen level of the product to about 25 ppm at the 40% conversion level. Another way to express this result is that according to the curve in the FIGURE, the conversion level would have to be at least 60% to approach the low concentration of nitrogen in the product achieved with the catalyst of this invention operating at the 40% conversion level. The zeolite catalysts are not selective for denitrogenation (even though they contain tungsten plus Ni-SMM), while the catalysts of this invention are selective at low conversions.

EXAMPLE 6

The product from Example 3 is distilled to remove the portion boiling below 675° F. (375° C.). The portion boiling below 675° F. (357° C.) is further distilled into a portion boiling below 350° F. (177° C.) (gasolines) and a portion boiling from 350° to 675° F. (177° to 357° C.) (middle distillates). The portion boiling above 675° F. (357° C.) is hydrocracked using a zeolitic catalyst under hydrocracking conditions to produce gasoline and middle distillate range boiling products.

Resort may be had to such variations and modifications as fall within the spirit of the invention and the scope of the appended claims.

We claim:

1. A process for the hydrodenitrification of a charge stock containing at least 350 ppm of organic nitrogen which comprises
   contacting said charge stock under hydrodenitrification conditions including a temperature from 400° to 950° F. with a non-zeolitic catalyst consisting essentially of
   i. from 60 to 92 weight percent of a laminar 2:1 layer-lattice aluminosilicate mineral possessing layer-lattice unit cells, each cell having an inherent negative charge balanced by cations exterior to said unit cell, said mineral corresponding to the following overall formula prior to drying and calcining:

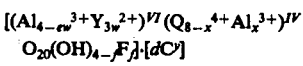

where Al is aluminum;
Y is selected from the class consisting of nickel, cobalt and mixtures thereof;
Q is at least 0.95 mol fraction silicon ions, the remainder consisting of tetravalent ions having an ionic radius not to exceed 0.65 A; and
F is fluorine;
C is at least one charge-balancing cation; and where $e$ has a numerical value from 2 to 3 inclusive;
$w$ has a numerical value from 0.01 to 2 inclusive, with the proviso that the quantity $ew$ have a numerical value from 0.02 to 4 inclusive;
$f$ has a value of 4 or less;
$x$ has a numerical value from 0.05 to 2.0 inclusive;
$y$ is the valence of the cation C;
$d$ is the number of cations C where the product $dy = x + 3(e-2)w$;
and wherein said first bracket represents said layerlattice unit cell formulation and said second bracket represents said charge-balancing cations; and
   ii. tungsten in the form of metal oxide or metal sulfide or a mixture thereof dispersed through said semicrystalline laminar 2:1 layer-lattice aluminosilicate mineral component in an amount from 5 to 30 weight percent of said catalyst, calculated as the metal;
to obtain a product containing less than 10 ppm of nitrogen and wherein less than 50 weight percent of said product boils at a temperature substantially below the boiling range of the charge stock.

2. A process according to claim 1 wherein the charge stock is a liquid hydrocarbon containing material having substantial portions boiling above 250° F.

3. A process according to claim 2 wherein Q is silica and Y is nickel.

4. A process according to claim 3 wherein said tungsten is present in an amount of 6 to 20 weight percent of said catalyst, calculated as the metal.

5. A process according to claim 1 wherein said catalyst is sulfided before use.

6. A process according to claim 5 wherein said catalyst is sulfided with a gas stream containing H$_2$S.

7. A process for the hydrodenitrification of a hydrocarbon containing charge stock containing 350 to 4000 ppm of nitrogen which comprises:
   1. contacting said charge stock under hydrodenitrification conditions including a temperature from 400-950° F in the presence of a catalyst composite consisting essentially of:
   i. from 60 to 92 weight percent of a laminar 2:1 layer-lattice aluminosilicate mineral possessing layer-lattice unit cells, each cell having an inherent negative charge balanced by cations exterior to said unit cell, said mineral corresponding to the following overall formula prior to drying and calcining:

$$[(Al_{4-ew}{}^{3+}Y_{3w}{}^{2+})^{VI}(Q_{8-x}{}^{4+}Al_x{}^{3+})^{IV}O_{20}(OH)_{4-f}F_f]\cdot[dC^y]$$

where Al is aluminum;
Y is selected from the class consisting of nickel, cobalt and mixtures thereof;
Q is at least 0.95 mol fraction silicon ions, the remainder consisting of tetravalent ions having an ionic radius not to exceed 0.65 A; and
F is fluorine;
C is at least one charge-balancing cation; and where $e$ has a numerical value from 2 to 3 inclusive;
$w$ has a numerical value from 0.01 to 2 inclusive, with the proviso that the quantity $ew$ have a numerical value from 0.02 to 4 inclusive;
$f$ has a value of 4 or less;
$x$ has a numerical value from 0.05 to 2.0 inclusive;
$y$ is the valence of the cation C;
$d$ is the number of cations C where the product $dy = x + 3(e-2)w$;
and wherein said first bracket represents said layer-lattice unit cell formulation and said second bracket represents said charge-balancing cations; and
ii. tungsten in the form of metal oxide or metal sulfide or a mixture thereof dispersed through said semicrystalline laminar 2:1 layer-lattice aluminosilicate mineral component in an amount from 5 to 30 weight percent of said catalyst, calculated as the metal;
to obtain a first product which has less than 10 ppm of nitrogen and wherein less than 50 weight percent of said product boils at a temperature substantially below the boiling range of the charge stock;
2. removing any portions of the product boiling below 675° F.; and
3. passing the product of step 2 through a hydrocracking zone under hydrocracking conditions to produce gasoline and middle distillate.

8. A process according to claim 7 wherein said tungsten is present in an amount of 6 to 20 weight percent of said catalyst, calculated as the metal.

* * * * *

UNITED STATES PATENT OFFICE
CERTIFICATE OF CORRECTION

Patent No. 4,065,380      Dated December 27, 1977

Inventor(s) Harold E. Swift and Roger F. Vogel

It is certified that error appears in the above-identified patent and that said Letters Patent are hereby corrected as shown below:

Col. 4, line 51, "0.05" should be --0.5--;

Col. 6, line 20, "each" should be --such--;

Col. 9, (Table 1) about line 27, after "Distillation", add -- D2887 --.

Col. 11, line 57, "(375°C.)" should be --(357°C.)--.

Signed and Sealed this

Twenty-sixth Day of September 1978

[SEAL]

Attest:

RUTH C. MASON
Attesting Officer

DONALD W. BANNER
Commissioner of Patents and Trademarks